United States Patent [19]

Markowski

[11] 4,145,880

[45] Mar. 27, 1979

[54] VORBIX AUGMENTER CONFIGURATION WITH DIFFUSER AND VORBIX SWIRLER

[75] Inventor: Stanley J. Markowski, East Hartford, Conn.

[73] Assignee: United Technologies Corp., Hartford, Conn.

[21] Appl. No.: 861,092

[22] Filed: Dec. 15, 1977

[51] Int. Cl.² ............................................. F02C 7/22
[52] U.S. Cl. ..................................... 60/261; 60/262; 60/39.74 R
[58] Field of Search .............. 60/261, 262, 39.74 R, 60/39.71, 39.65

[56] References Cited

U.S. PATENT DOCUMENTS

| | | | |
|---|---|---|---|
| 3,879,939 | 4/1975 | Markowski | 60/39.65 |
| 3,930,370 | 1/1976 | Markowski et al. | 60/262 |
| 3,973,390 | 8/1976 | Jeroszko | 60/39.65 |
| 3,999,378 | 12/1976 | Tatem et al. | 60/39.65 |
| 4,045,456 | 9/1977 | Markowski et al. | 60/39.65 |

Primary Examiner—Robert E. Garrett
Attorney, Agent, or Firm—Charles A. Warren

[57] ABSTRACT

An augmenter construction for fan engines in which the fan air and the engine gas are distributed through transition ducts terminating in vortex generators and the fuel rich pilot gas discharges around these vortex generators to mix with the vortices for improved combustion. The transition tubes have diffuser sections extending from the vortex generators and these sections have rectangular or multisided terminal ends.

10 Claims, 2 Drawing Figures

VORBIX AUGMENTER CONFIGURATION WITH DIFFUSER AND VORBIX SWIRLER

BACKGROUND OF THE INVENTION

The use of augmenters with fan engines always presents a problem of mixing the fan air and the engine gas with the fuel to provide a suitable combustible mixture in the combustion chamber. Adequate mixing regularly requires a relatively long duct because of the velocities encountered if such mixing is accomplished with a minimum loss of energy in the propulsive fluid.

SUMMARY OF THE INVENTION

The principal feature of this invention is the mixing of the fuel rich pilot gases with both the engine gas and the fan air in a short length of duct, in such a manner that suitable combustion will occur across the entire diameter of the combustion chamber. Another feature is the use of vortex generators combined with non-circular diffusers to produce the desired mixing of the fuel rich gas with the other fluids.

According to the invention, the fan air and the engine gas are discharged through transition ducts in which vortex generators impart a swirl to the gases flowing therethrough, with the swirling gases discharging through noncircular, preferably square or rectangular diffuser end sections on the transition tubes. The fuel rich pilot gas flows around the transition ducts and enters the combustion chamber past the ends of the diffuser sections which are so arranged that the pilot gas may flow between adjacent sections and past the sections on all sides for mixing the pilot gas with the gases from within the diffusers.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENTS

Figure 1:
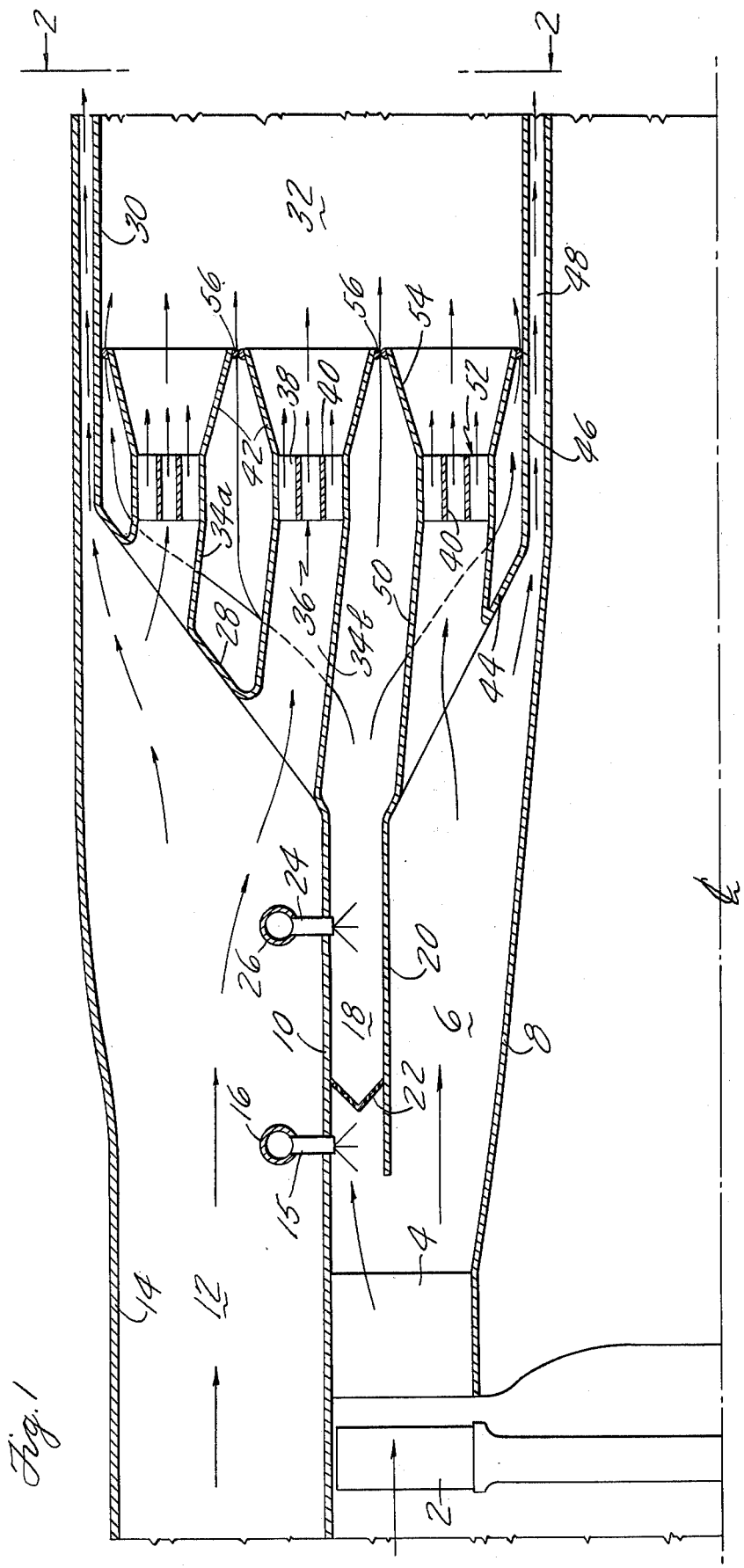
FIG. 1 is a sectional view through the augmenter as applied to a fan engine.
Figure 2:
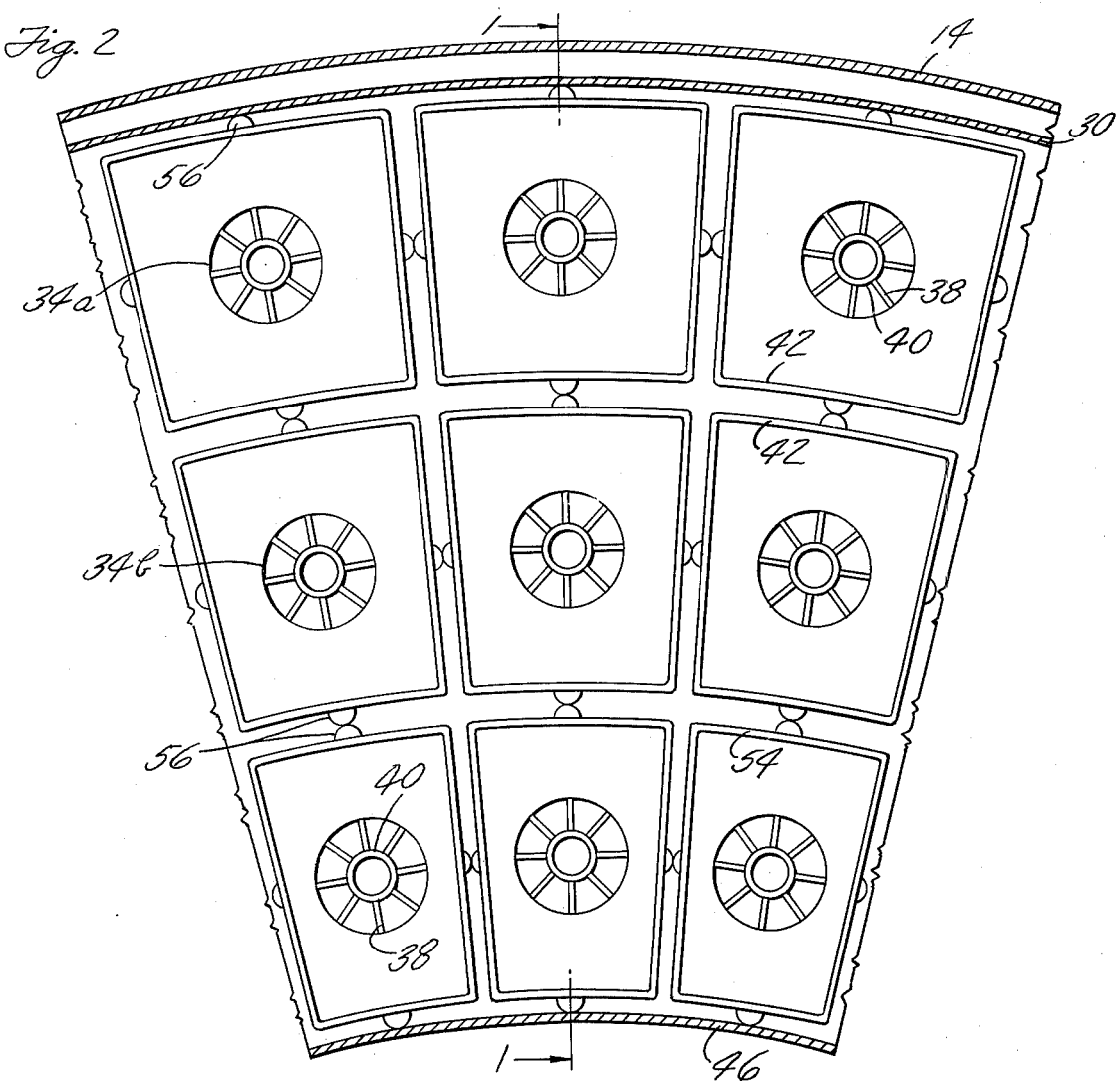
FIG. 2 is a section along the line 2—2 of FIG. 1.

Referring to FIG. 1, the engine gas is exhausted past the last turbine stage 2 and the row of straightening vanes 4 into the exhaust duct 6 defined by an inner wall provided by the tail cone 8 and an intermediate duct wall 10. Outside of the duct wall 10 is the fan air duct 12 between the wall 10 and an outer wall 14.

The intermediate wall 10 carries a row of pilot fuel nozzles 15 receiving fuel from a manifold 16 and discharging fuel into an annular passage 18 defined between the intermediate wall and an inner shield 20 spaced inwardly from the intermediate wall. This shield begins at a point downstream of the vanes 4 and extends downwardly past a flameholder 22 and past a row of secondary fuel nozzles 24. These nozzles 24 are also mounted in the wall 10 and have a fuel manifold 26 for supplying the fuel.

These nozzles are preferably just upstream of an obliquely extending wall 28 that extends from the end of the intermediate wall 10 almost to the outer wall 14. This oblique wall 28 is connected at its downstream end to an annular duct wall 30 closely spaced from the outer wall 14 to define a cooling air passage around the combustion chamber 32. Ignition of the pilot fuel mixed with hot engine gas in the duct wall results in combustion in the passage 18 downstream of the flameholder 22. Additional fuel from the nozzles 24 is vaporized and carried downstream into the combustion chamber as will be described.

The fan air above the wall 28 is diverted into a plurality of axially extending tubes 34 extending downstream from this wall and terminating in vortex generators 36. These tubes may have any selected arrangement so long as they accommodate the fan air flow. As shown, there are two rows of these tubes, an inner row 34a and an outer row 34b; and as shown the outer row is in radial alignment with the inner row although this is not essential. The vortex generators comprise a row of turning vanes 38 extending inwardly from the tube wall and terminating in a smaller tube 40 supporting the inner ends of the vanes and providing a central duct for air that is not affected by the vanes so that it flows axially without any swirl. All of the vortex generators preferably terminate substantially in the same transverse plane as shown.

Attached to the downstream ends of the tubes 34 are diffusers 42 that are circular at their upstream ends to fit the tubes and diverge to truncated sector shape or nearly rectangular as shown. These diffusers are arranged so as nearly to fill the axial passage in which they are located. The downstream ends have adequate clearance from each other and the shield 30 to permit the fuel rich gases from the pilot duct to flow around the diffuser ends and in mixing with the air within the diffusers produce a combustible mixture. The diffusers create enough turbulence to assure good mixing with the vortex air from the vortex generators.

The downstream end of the shield 20 terminates at a point nearly opposite the end of intermediate wall 10 and this shield is secured to an oblique wall 44 extending across the engine air duct 6 and connected at its downstream end to the upper end of a shield 46 parallel to and closely spaced from the tail cone to form a cooling passage 48. Tubes 50 similar to the tubes 34 extend in parallel relation axially of the augmenter and terminate in vortex generators 52 similar to the generators 36 above described. Diffusers 54 extend from these generators as do the diffusers 42 and all the diffusers terminate substantially in the same transverse plane as shown. The diffusers 54 are closely spaced from each other and from the diffusers 42 and the shield 46 to allow a flow of fuel rich gas from the passage as will be apparent.

The necessary spacing of the diffusers may be established and maintained by cooperating dimples 56 on adjacent diffusers, both in a radial and a circumferential direction. The engine gas and fan air discharging from the vortex generators is in a plurality of vortices, one for each vortex generator. These vortices may all be in the same direction but are preferably alternating; that is to say, adjacent vortices swirl in opposite direction creating a turbulence that improves combustion in the chamber directly downstream of these vortex generators.

The diffusers by their change in shape from circular to rectangular tend to break at least the outer portion of the generated vortices into a number of higher intensity vortices thereby increasing the mixing rate with the fuel rich gas from around the diffusers. The result is complete combustion in a relatively short combustion chamber. The rectangular exit for the diffusers further permits an accurate control of the relative flow areas within and external to the diffusers so that the fuel rich gas around the diffusers will be properly proportioned to the vortex air to assure complete combustion under optimum conditions.

It will be understood that the pilot fuel from nozzles 15 burns downstream of the flameholder and adds heat to the gas in the passage 18 to increase the rate of vaporization of the fuel injected by the nozzles 24. This fuel as it vaporizes and mixes with the gas in passage 18 produces a fuel rich mixture flowing around the vortex generators and the diffusers 42 and the rate of flow is such that the fuel is carried downstream past the trailing edges of the diffusers before vaporization is complete enough for combustion. This vaporization time together with the fuel ignition time assures that the fuel rich mixture will have passed the diffuser edges before burning takes place. The fuel quantity from the nozzles 24 is in such proportion to the gas in passage 18 as to assure a fuel rich mixture that will mix with the gas discharging from the vortex generators and burn completely in the combustion zone.

From the combustion chamber the hot gases are discharged through a thrust nozzle not shown carried by the downstream end of the outer wall 14. The effect of the augmenter construction above described is to permit a shorter combustion chamber thereby allowing the nozzle to be closer to the diffusers than would otherwise be possible. The construction described also permits and assures more complete burning in the combustion so that all the energy available in the fuel will be utilized in the nozzle.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An augmenter for use with a ducted fan gas turbine engine including:
   a passage for exhaust gas from the turbine defined between an inner and an intermediate duct;
   a surrounding passage for fan air defined between the intermediate duct and an outer surrounding duct;
   axially extending tubes into which fan air enters from the fan air passage;
   other axially extending tubes into which a part of the engine gas is directed from said first passage;
   a pilot passage defined by a shield parallel to and spaced inwardly from the intermediate duct and receiving gas from said first passage;
   means for discharging fuel into said pilot passage;
   means for directing a mixture of gas and fuel from said pilot passage around said axially extending tubes;
   vortex generators in said tubes for imparting swirls to the fluids therein; and
   diffusers on the downstream ends of the tubes, said diffusers diverging in a downstream direction and changing from circular to substantially rectangular in shape, with
   the downstream ends of the diffusers being spaced apart for the flow of gas and fuel from the pilot passage around said diffusers to mix with the vortices within the diffusers.

2. An augmenter as in claim 1 in which a diverging wall extends from the intermediate duct toward the outer duct, with the tubes for the fan air positioned in said diverging wall.

3. An agumenter as in claim 2 in which another diverging wall extends from said shield toward the inner duct with the other tubes secured in said diverging wall.

4. An agumenter as in claim 1 in which the intermediate wall supports a row of fuel nozzles for delivering fuel to said pilot passage.

5. An augmenter for use on a ducted fan engine including:
   an outer duct surrounding the augmenter;
   an intermediate duct within and spaced from the outer duct to define a fan air passage;
   an inner duct within and spaced from the intermediate duct to define an engine exhaust gas passage;
   a shield within the engine gas passage and spaced from the intermediate wall to define a pilot gas passage therebetween;
   diverging walls secured to the downstream ends of the intermediate wall and the shield and extending toward the outer and inner ducts, respectively; and
   vortex generators including outer and inner shroud rings with turning vanes therebetween and positioned downstream of and connected to said walls to receive fan air and engine gas, respectively, said vortex generators being spaced apart to permit gas and fuel from said pilot passage to flow around said vortex generators to mix with the vortices created by said generators.

6. An augmenter as in claim 5 in which the vortex generators are connected to the diverging walls by tubes secured in said diverging walls.

7. An augmenter as in claim 5 including diffusers on the downstream sides of the vortex generators, said diffusers diverging from circular at the generators to substantially rectangular at their downstream ends.

8. An augmenter as in claim 7 in which the diffusers all terminate substantially in the same transverse plane, and are spaced apart from each other and from the inner and outer walls for a flow of the pilot gas and fuel around the diffusers.

9. An augmenter as in claim 5 including a row of pilot fuel nozzles for discharging fuel into said pilot passage, a flameholder downstream of said fuel nozzles, and another row of fuel nozzles downstream of the flameholder and adjacent to the end of the pilot passage.

10. An augmenter as in claim 8 including cooperating detents on adjacent diffusers to hold the diffusers in spaced relation.